UNITED STATES PATENT OFFICE.

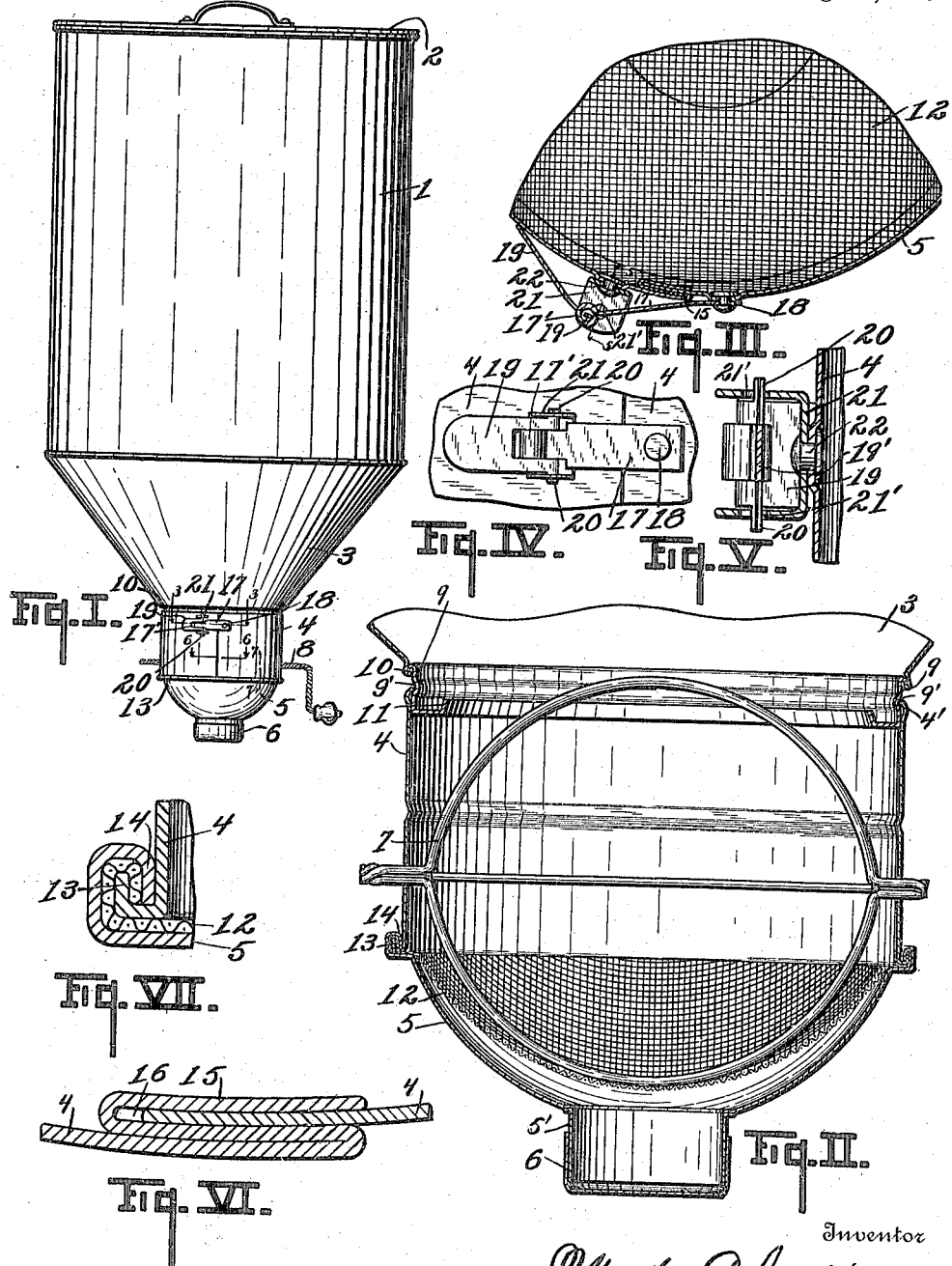

MARTIN SCHUILING, OF GRAND RAPIDS, MICHIGAN.

COMBINATION FLOUR BIN AND SIFTER.

1,194,552.  Specification of Letters Patent.  Patented Aug. 15, 1916.

Application filed February 7, 1913. Serial No. 746,725.

*To all whom it may concern:*

Be it known that I, MARTIN SCHUILING, a citizen of the United States, residing at the city of Grand Rapids, Michigan, have invented certain new and useful Improvements in Combination Flour Bins and Sifters, of which the following is a specification.

This invention relates to improvements in combination flour bins and sifters.

The main object of this invention is to provide an improved combination flour bin and sifter in which the sifter is readily removable to permit cleaning of the same and one which is simple and economical in structure and easily manipulated.

Further objects, and objects relating to structural details, will definitely appear from the detailed description to follow.

I accomplish the objects of my invention by the devices and means described in the following specification.

The invention is clearly defined and pointed out in the claim.

A structure which is a preferred embodiment of my invention is clearly illustrated in the accompanying drawing forming a part of this specification, in which:

Figure I is a front elevation of a structure embodying the features of my invention. Fig. II is an enlarged detail vertical section through the sifter portion of the structure shown in Fig. I. Fig. III is a detail horizontal section on a line corresponding to line 3—3 of Fig. I, showing structural details of the means for removably securing the sifter to the bin. Fig. IV is an enlarged detail side elevation of the sieve securing means. Fig. V is an enlarged detail vertical section on a line corresponding to line 5—5 of Fig. III. Fig. VI is an enlarged detail section showing the telescoping joint for the ends of the sieve body, taken on a line corresponding to line 6—6 of Fig. I. Fig. VII is an enlarged detail vertical section on a line corresponding to line 7—7 of Fig. I, showing the seam connection for the sieve bottom to the body thereof.

In the drawing, similar reference characters refer to similar parts throughout the several views, and the sectional views are taken looking in the direction of the little arrows at the ends of the section lines.

Referring to the drawing, the bin or receptacle 1 is cylindrical in form and preferably formed of tin, it being provided with a suitable cover 2. The bin 1 is provided with a downwardly contracting hopper portion 3.

The sieve comprises a band-like body portion 4 provided with a spherically curved bottom 5. The bottom has a central neck 5' provided with a cap-like closure 6.

The agitator 7 is formed of wires having their ends twisted together to form journals and the crank 8, as shown in Figs. I and II. The agitator is journaled in the walls of the body portion 4, the journals being loosely engaged in the body to permit it to expand and collapse as it is clamped open or removed from the hopper.

The hopper is provided with a ring-like neck 9 at its lower end. The neck 9 is secured to the body of the hopper by the seam 10. The lower end of the ring or neck 9 is turned inwardly or flanged to reinforce it.

When all the flour is exhausted, that is, all that will readily run out of the bin, there still remains some adhering to the walls. In removing the sieve, the jarring of the bin loosens this flour so that it drops down. This ledge collects the flour thus dropping from the walls when the sieve is removed, preventing its dropping onto the floor or table above which the bin is suspended.

The neck 9 is provided with an annular groove 9' formed by beading the same, the body 4 of the sieve being turned inwardly at its upper edge as at 4', to engage this groove when the body is clamped upon the hopper.

The bottom 5 and the body are seamed together, the body member 4 being provided with an outwardly and upwardly turned flange 14 which flange and the edge of the sieve 12 are folded over the flange 13 and clamped between it and the walls of the body.

The body 4 is band-like, as stated, its ends being telescoped together. One end of the body is folded rearwardly and thence forwardly, the forwardly turned portion being spaced from the rearwardly turned portion to provide a space 16 into which the other end of the body telescopes. This forms a close telescoping joint and permits the body being expanded to release it from the hopper or collapsed to clamp it upon the hopper. The joint for the bottom to the body portion 4 when formed as described, is not affected by this telescoping movement of the body.

Means for clamping the body of the sieve upon the member 9 are provided, consisting of the strap 17 which is secured to one end of the body by the rivet 18 and the lever 19 which is pivoted upon the bracket 21 secured to the other end of the body by the rivet 22, the lever being provided with pivots 20 engaging pivot holes 21' in the bracket 21.

The strap 17 is provided with an eye or loop 17' which engages a cross piece 19' on the lever. When the lever is swung to the position shown in Fig. III, the strap is carried past the center of the lever pivots applying stress to the strap and also locking the parts in their closed position. This forms a simple and effective clamping means for the sieve and one which is very readily engaged or disengaged.

Having thus described my invention, what I claim is new and desire to secure by Letters Patent is:

In a flour sifter, the combination of a receptacle provided with a neck at its lower end, said neck having an external annular groove therein, a sieve comprising a band-like body portion adapted to embrace said neck and having its upper edge turned inwardly to engage said groove and having telescoping ends permitting its expansion and contraction so that it may be expanded and contracted to engage and disengage its inturned edge with said groove, fastening means provided on the ends of said band-like body portion adapted to draw it together to clamp it upon said neck, and an agitator and sieve bottom carried by said body portion.

In witness whereof, I have hereunto set my hand and seal in the presence of two witnesses.

MARTIN SCHUILING. [L. S.]

Witnesses:
JOHN KNOTTNERUS,
W. F. STRAUSS.

Copies of this patent may be obtained for five cents each, by addressing the "Commissioner of Patents, Washington, D. C."